United States Patent
Prokopenko et al.

(10) Patent No.: US 7,146,486 B1
(45) Date of Patent: Dec. 5, 2006

(54) SIMD PROCESSOR WITH SCALAR ARITHMETIC LOGIC UNITS

(75) Inventors: Boris Prokopenko, Milpitas, CA (US); Timour Paltashev, Fremont, CA (US); Derek Gladding, San Francisco, CA (US)

(73) Assignee: S3 Graphics Co., Ltd. (KY)

( * ) Notice: Subject to any disclaimer, the term of this patent is extended or adjusted under 35 U.S.C. 154(b) by 528 days.

(21) Appl. No.: 10/354,795

(22) Filed: Jan. 29, 2003

(51) Int. Cl.
  *G06F 15/00* (2006.01)
  *G06F 15/76* (2006.01)
(52) U.S. Cl. .................. 712/22; 712/2; 712/9
(58) Field of Classification Search ............ 712/22, 712/19, 18
  See application file for complete search history.

(56) References Cited

U.S. PATENT DOCUMENTS 4,524,455 A * 6/1985 Holsztynski et al. ........ 382/303
4,739,474 A * 4/1988 Holsztynski ................. 712/14
5,179,714 A * 1/1993 Graybill ...................... 712/19
5,642,444 A * 6/1997 Mostafavi .................... 382/303

OTHER PUBLICATIONS

"Warp Architecture and Implementation" by Marco Annaratone, Emmanuel Arnould, Thomas Gross, H.T. Kung, Monica S. Lam, Onat Menzilcioglu, Ken Sarocky, and Jon A. Webb.*

* cited by examiner

*Primary Examiner*—Fritz Fleming
*Assistant Examiner*—Benjamin P. Geib
(74) *Attorney, Agent, or Firm*—Anthony B. Diepenbrock, III; Dechert LLP

(57) ABSTRACT

A scalar processor that includes a plurality of scalar arithmetic logic units and a special function unit. Each scalar unit performs, in a different time interval, the same operation on a different data item, where each different time interval is one of a plurality of successive, adjacent time intervals. Each unit provides an output data item in the time interval in which the unit performs the operation and provides a processed data item in the last of the successive, adjacent time intervals. The special function unit provides a special function computation for the output data item of a selected one of the scalar units, in the time interval in which the selected scalar unit performs the operation, so as to avoid a conflict in use among the scalar units. A vector processing unit includes an input data buffer, the scalar processor, and an output orthogonal converter.

6 Claims, 8 Drawing Sheets

Datapath representation for processing 1 set of data

SUB r2, r0, r1

1

DP3 r3.x, r2, r2

2

RSQ r3.x, r3.x

3

MUL r2, r2, r3.x

4

Normalized vector difference

To process 4 sets of data this sequence should be repeated 4 times and take 16 instruction cycles

US 7,146,486 B1

SIMD PROCESSOR WITH SCALAR ARITHMETIC LOGIC UNITS

BACKGROUND OF THE INVENTION

1. Field of the Invention

The present invention generally relates to graphics vector processors and more particularly to a graphics processor with scalar arithmetic logic units (ALUs) capable of processing graphics vector data.

2. Description of the Prior Art

Graphics data can be represented in a vector format with components of geometry information (XYZW) or pixel value information (RGBA). Typically, the geometry engines used with these vectors process all of the components at once leading to complicated internal architecture and relatively high latency between data input and data output. The typical geometry engine is an important front-end part of any modern graphics accelerator. The speed of the geometry data processing affects the entire efficiency of the architecture of the graphics accelerator.

Recent graphics API developments require the support of particular instruction sets and define the hardware capabilities to process geometry and pixel value vectors. Because of these high performance requirements, current graphic engines are implemented as a unit that process all vector components in parallel with complicated input data and internal data crossbars. Furthermore, in order to meet these performance requirements, the graphics engines use multiple vector units in SIMD (Single Instruction, Multiple Data) or MIMD (Multiple Instruction, Multiple Data) architecture with additional hardware and time overhead. This leads to VLIW (Very Large Instruction Word) architecture with complex control and synchronization units supporting multithreaded execution of programs.

Referring to FIG. 1, a data flow 10 for a prior art vector processing unit is shown. A graphics vector 12 having components Xi, Yi, Zi, and Wi is inputted into a buffer memory 14. Each graphics vector 12 is read sequentially from the buffer memory 14 into a vector ALU 16. The single vector ALU 16 operates on each component of the vector 12 at the same time in parallel. The vector ALU 16 includes a special function unit 18 for performing special operations. The internal structure of the ALU 16 is large and complicated in order to perform operations on all four components (i.e., Xi, Yi, Zi, and Wi) of the vector 12. Furthermore, the internal protocols and communication of the ALU 16 are complicated due to the parallel nature of the operations being performed. A final output vector 20 having components Xout, Yout, Zout, and Wout is generated by the vector ALU 16. The architecture of the prior art vector processing unit can be considered parallel (full vector or horizontal) vector component flow because the components of each vector 12 are processed concurrently.

Referring to FIG. 2, a datapath representation for processing one set of data with the prior art vector processing unit is shown. In the example shown in FIG. 2, the function is:

vector Normalized_Difference (vector V1, vector V2)
V1 -> r0.xyzw   V2 -> r1.xyzw   (xyzw - components of graphics data)

The corresponding instructions for this function are:

SUB r2, r0, r1      //subtraction of all components
DP3 r3.x, r2, r2    //dot product of 3 components (x, y, z) with result in x-component
RSQ r3.x, r3.x      //reciprocal square root of result in x-component
MUL r2, r2, r3.x    //scaling all components with RSQ result Referring to FIG. 2, the first instruction cycle (1) performs the subtraction between r0 and r1 and generates output vector r2 for each of the components x,y,z, and w. Next, in the second instruction cycle (2), the dot product is performed on r2 itself with the result only in the x component such that r3.x is generated. The reciprocal square root of r3.x is operated upon in the third instruction cycle (3). As seen in FIG. 2, during the third instruction cycle (3), only the x component is being operated upon. Next, in the fourth instruction cycle (4), the r2 components are scaled only by the x component (i.e., r3.x) to generate the normalized vector difference r2. In order to process four sets of data, the process is repeated four times and would take a total of sixteen instruction cycles.

It can be seen that the prior art vector processing unit can be very complex due to the parallel processing of vector components. Accordingly, latency becomes an issue during the processing. Furthermore, the prior art vector processing unit needs a large instruction format with multiple bits to control the vector component routing and processing. Also, the prior art vector processing unit has a complex input data bus to support the required graphics API functionality. Also, data dependency detection by hardware or software is required when using the prior art vector processing unit.

The present invention addresses the deficiencies in the above-mentioned prior art vector processing units by providing a vector processing unit that uses scalar ALUs. Accordingly, the present invention provides a SIMD scalar processing unit which is less complex and smaller in size than the prior art units. Furthermore, the present invention provides a system whereby the instruction set is simpler than the prior art vector processing unit and latency is greatly reduced.

SUMMARY OF THE INVENTION

In accordance with the present invention there is provided a SIMD scalar processing unit for processing at least two vectors having multiple components. The SIMD scalar processing unit has an input data buffer for arranging the components of the vectors from a parallel vector component flow into a sequential vector component flow. The SIMD scalar processing unit further includes at least one scalar arithmetic logic unit operable to receive the components of the vectors from the input data buffer. The scalar arithmetic logic unit is operable to perform a function on each of the components of the vectors in order to determine a result. The SIMD scalar processing unit further includes an output converter operable to receive the results from the arithmetic logic unit. The output converter can rearrange the components back into a parallel vector component flow if it is required.

The SIMD scalar processing unit further includes a special function unit that is operable to communicate with the scalar arithmetic logic units. The special function unit can perform operations on the vector components that the scalar arithmetic logic units cannot. In this respect, the SIMD scalar processing unit will further include a multiplexer operative to receive vector components from each of the scalar arithmetic logic units and select a component for processing by the special function unit.

Typically, the vector will have i components and the scalar processing unit will have i scalar arithmetic logic units (SCU). Each of the scalar arithmetic logic units are subsequently (or serially) connected to one another such that an instruction sent to a first scalar arithmetic logic unit is delayed before being sent to a subsequent scalar arithmetic logic unit. Each of the scalar arithmetic logic units has at least one instruction delay register for delaying instructions to another arithmetic logic unit subsequently (or serially) connected thereto. Furthermore, address and control signals can be delayed to subsequent scalar arithmetic logic units.

The scalar arithmetic logic unit SCU further includes a datapath section for performing the operation on the component of the vector, and a control and address module for operating the datapath section. The scalar arithmetic logic unit SCU may further include at least one data delay register for delaying common data to another arithmetic logic unit subsequently (or serially) connected thereto.

In accordance with the present invention there is provided a method of processing at least two vectors having multiple components with a SIMD scalar processing unit. The method begins by arranging the components of the vectors from a parallel vector component flow into a sequential vector component flow with the input data buffer. Next, the operation is performed on a vector component with a respective one of the scalar arithmetic logic units in order to generate a result. Furthermore, the special function unit may perform an operation on the component. Finally, the components of the result are rearranged by the output converter into a parallel vector component flow.

In accordance with the present invention, there is provided a scalar arithmetic logic unit for a SIMD scalar processing unit which processes vector components. The scalar arithmetic logic unit can be subsequently (or serially) connected to another arithmetic logic unit of the scalar processing unit. The scalar arithmetic logic unit has a datapath section for performing operations on the vector components. Additionally, the scalar arithmetic logic unit has a delay register section for delaying the issuance of vector components to other arithmetic logic units subsequently (or serially) connected thereto. In accordance with the present invention, the delay register section of the scalar arithmetic logic unit may include a delay register for each vector component passing through the scalar arithmetic logic unit. The scalar arithmetic logic unit further includes an address and control module which is operative to control the datapath section. An address and control delay register of the scalar arithmetic logic unit can delay the timing of address and control signals to subsequent scalar arithmetic logic units connected thereto. Furthermore, the scalar arithmetic logic unit may have a common data delay register for delaying the timing of common data to the datapath section.

In accordance with the present invention, there is provided a SIMD processing unit for processing a vector having x, y, z, and w components. Each of the x, y, z, and w components has multiple values. The SIMD processing unit has an orthogonal access memory for arranging a parallel vector component flow of the multiple values for each component into a sequential vector component flow. The SIMD processing unit further includes a scalar processor in electrical communication with the orthogonal access memory. The scalar processor has a bank of scalar arithmetic logic units that are operable to perform an operation on each value of the component from the orthogonal access memory and generate a result. The scalar processor further includes a special function unit in electrical communication with the bank of scalar arithmetic logic units. The special function unit is operative to perform an operation on a result from one of the scalar arithmetic logic units and return the result to the same arithmetic logic unit. The SIMD processing unit further includes an output orthogonal converter in electrical communication with the scalar processor. The output orthogonal converter is operable to arrange the results from the scalar processor into a parallel vector component flow.

One embodiment of the present invention is a scalar processor that includes a plurality of scalar arithmetic logic units, a multiplexer, and a single special function unit. Each of the scalar units is operative to perform, in a different time interval, the same operation on a different data item, where each different time interval is one of a plurality of successive, adjacent time intervals, and where each unit provides an output data item in the time interval in which the unit performs said operation and each unit provides a processed data item in a last one of the successive, adjacent time intervals. The multiplexer is configured to provide the output data item from a selected one of the scalar units. The single special function unit is operable to provide a special function computation for the output data item of a selected one of the scalar units, in the time interval in which teh selected scalar unit performs the operation, so as to avoid a conflict in use among the scalar units. Each scalar unit has an address and control path for carrying address and control information that commands the operation, where the address and control path includes a delay element having a delay equal to the time interval, and where the address and control paths are connected in series such that the address and control information arrives at each unit in the time interval in which the scalar unit performs the operation. Each scalar unit has a data processing path and one or more delay paths, each of which includes a delay element having a delay equal to the time interval, connected in series with the data processing path such that each different data item arrives in the scalar unit in the interval in which the unit performs the operation and such that the processed data item from each unit is available in the last of the successive time intervals.

Another embodiment of the present invention is a scalar processor that includes a plurality of means for scalar processing, means for selecting one of the processing means to provide an output data item, and means for performing a special function computation for the output data item of the selected one of the scalar processing means. Each scalar processing means is operative to perform, in a different time interval, the same operation on a different data item, where each different time interval is one of a plurality of successive, adjacent time intervals. Each scalar processing means provides an output data item in the time interval in which the processing means performs the operation, and each scalar processing means provides a processed data item in a last one of the successive adjacent time intervals. The special function computation performing means performs a special function in the time interval in which the selected scalar processing means performs the operation so as to avoid a conflict in use among the plurality of processing means.

BRIEF DESCRIPTION OF THE DRAWINGS

These as well as other features of the present invention will become more apparent upon reference to the drawings wherein.

DETAILED DESCRIPTION OF THE PREFERRED EMBODIMENT

Figure 3:
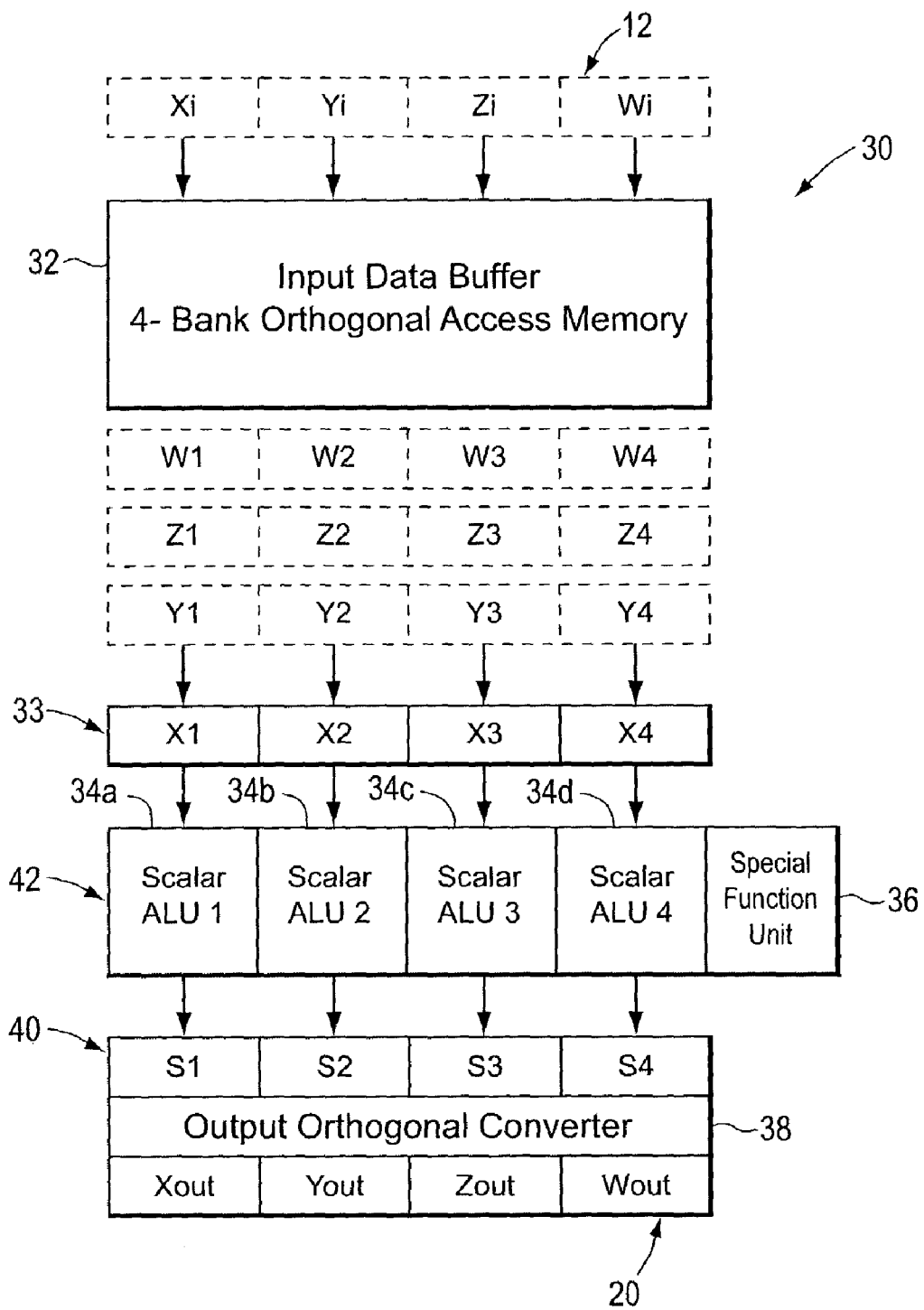
FIG. 3 illustrates a vector SIMD processing unit of the present invention.

Referring to the drawings wherein the showings are for purposes of illustrating a preferred embodiment of the present invention only, and not for purposes of limiting the same, FIG. 3 illustrates a SIMD vector processing unit 30 constructed in accordance with the present invention. A graphics vector 12 is inputted into an input data buffer 32 of the SIMD processing unit 30 in order to reorder the graphics vector 12 into the proper sequence. Specifically, the input data buffer 32 is a 4-bank orthogonal access memory which can output the components in a sequential (vertical) vector component flow. For instance, as seen in FIG. 3, the components of the vectors are rearranged such that the x components of each vector are outputted simultaneously. Therefore, X1, X2, X3, and X4 are outputted simultaneously as the component vector 33. Next, the Y components of each vector are outputted (i.e., Y1, Y2, Y3, and Y4). This process continues for the Z and W components as well. In this regard, the vectors are converted from a parallel vector component flow to a sequential vector component flow by the input data buffer 32.

The component vector 33 is inputted into a scalar processor 42 that has a bank of four scalar ALUs 34a–34d and a special function unit (SFU) 36. Each of the ALUs 34a–34d, as well as the SFU 36, performs the desired operations on the vector components 33. The processing of the components of the component vector 33 occurs in parallel by each of the scalar ALUs 34a–34d, as will be further explained below. The scalar processor 42 generates a scalar output vector 40 that is fed into an output orthogonal converter 38. The scalar output vector 40 must be rearranged in order to generate the output vector 20. The converter 38 is a vertical register capable of processing all of the components of the vector 12 simultaneously. In this respect, the converter 38 will rearrange the vector components from the scalar processor 42 into the correct parallel vector component flow for the output vector 20. The operation of the output orthogonal converter 38 is explained in greater detail in applicant's co-pending U.S. patent application "Synchronous Periodical Orthogonal Data Converter", U.S. patent application Ser. No. 10/666,083, filed on Sep. 19, 2003 the contents of which are incorporated by reference herein.

Figure 4:
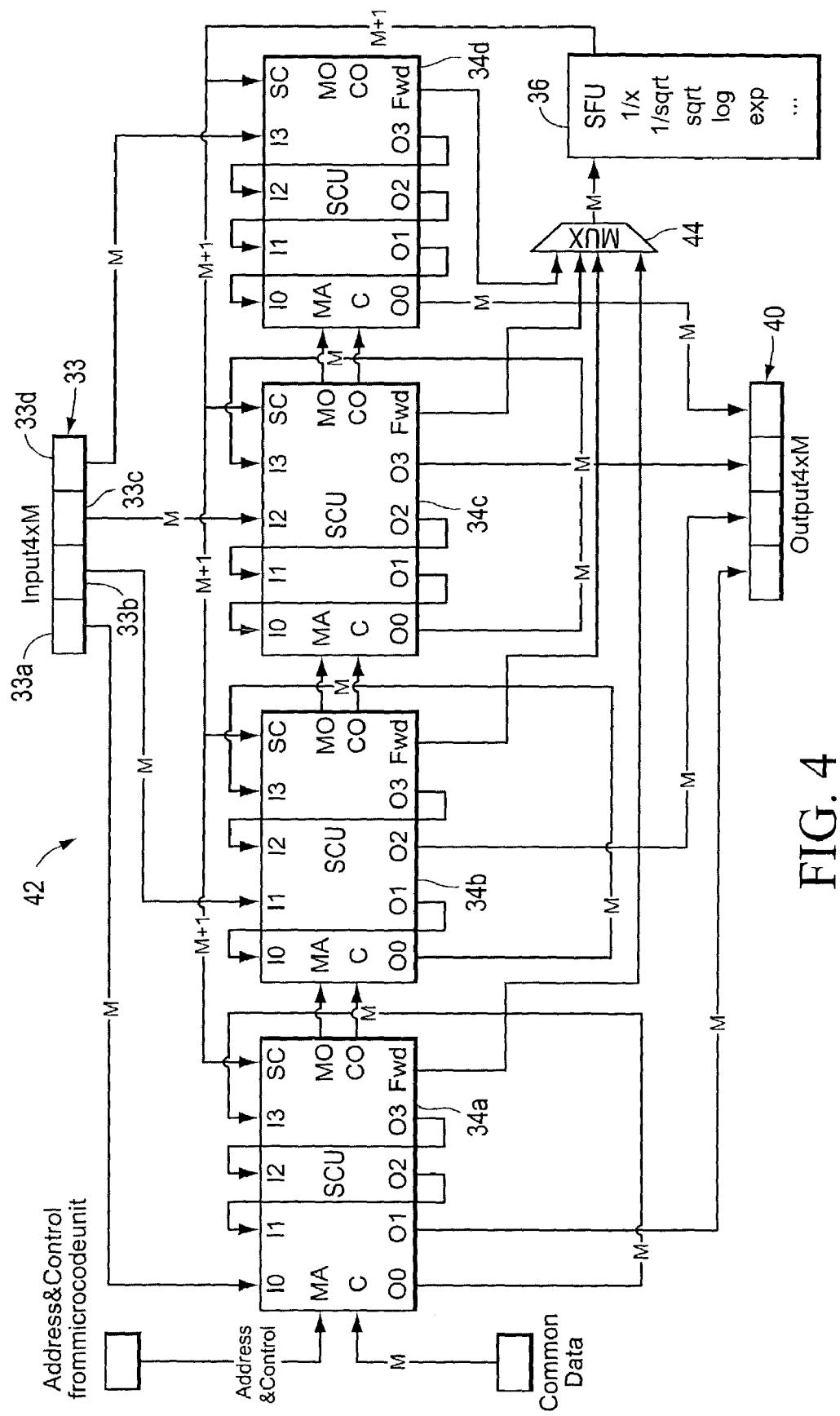
FIG. 4 is a diagram showing the physical organization of the scalar processor of the present invention.

Referring to FIG. 4, the physical organization of the scalar processor 42 is shown. The processor 42 has four identical scalar ALUs (SCU) 34a–34d and the special function unit 36. Each of the scalar ALUs 34a–34d has four inputs I0–I3 and four outputs O0–O3. Furthermore, each scalar ALU 34a–34d has a memory address input MA, a common data input C, a memory address output MO and a common data output CO. Additionally, each scalar ALU 34a–34d has a forward output FWD and a special function unit input SC.

The M bit individual components of each component vector 33 are inputted into a respective one of the inputs I0–I3 of the scalar ALUs 34a–34d. For example, if the component vector 33 contains the X components (i.e., X1, X2, X3 and X4), then the M bits of the first X component (i.e., X1) are inputted into I0 of the scalar ALU 34a. Similarly, the M bits of the second X component X2 are inputted into I1 of the second scalar ALU 34b, the M bits of the third X component X3 are inputted into I2 of the third scalar ALU 34c, and the M bits of the fourth X component X4 are inputted into I3 of the fourth scalar ALU 34d. The remaining inputs of each scalar ALU 34a–34d are connected to one of the outputs of that scalar ALU 34a–34d. For example, for the first scalar ALU 34a, output O0 is connected to input I3, output O2 is connected to input I1, and output O3 is connected to input I2. The output O1 is the final output and generates the first X component of the scalar ALU output vector 40. It will be recognized that each of the other scalar ALUs 34b–34d have respective outputs connected to respective ones of the inputs according to FIG. 4. The manner of connection of the inputs I0–I3 and O0–O3 is individual for each scalar ALU 34a–34d such that it depends on the activity in each instruction cycle to the instruction diagram shown in FIG. 5. The scalar ALU 34b generates the second component of the scalar ALU output vector 40 at output O2, the third component of the scalar ALU output vector 40 is generated at output O3 of scalar ALU 34c, and the fourth component of scalar output vector 40 is generated at output O0 of scalar ALU 34d.

In addition to the foregoing, each scalar ALU 34a–34d has its forward output FWD connected to a multiplexer 44. The output of the multiplexer 44 is connected to the SFU 36 which performs special functions such as 1/x, 1/sqrt, sqrt, log, exp, etc. . . . . The output of the SFU 36 is connected to the SC input of each of the scalar ALUs 34a–34d. As will be explained below, when an instruction to a scalar ALU 34a–34d cannot be performed by the scalar ALU 34a–34d, the SFU 36 will perform the operation and transfer the result back to the appropriate scalar ALU 34a–34d.

The MA input for each scalar ALU 34a–34d receives address and control signals. The MO output of each scalar ALU 34a–34d transfers the address and control signals to the next succeeding scalar ALU 34a–34d with an appropriate delay. As will be further explained below, the delay permits each successive ALU 34a–34d to process the instruction at the correct cycle in order to support parallel processing of the component vector 33. Similarly, M bits of common data from memory is inputted into the C input of each scalar ALU 34a–34d and transferred to a succeeding ALU 34a–34d by the CO output with the appropriate delay. It can be seen that the address and control signals are distributed sequentially from one scalar ALU 34 to another scalar ALU 34 with the appropriate delay. Furthermore, input data (vector components) are distributed directly to an appropriate input I0–I3 of each scalar ALU 34 thereby providing the required delay for processing in subsequent clock cycles. As can be seen from FIG. 4, the scalar processor 42 only has three types of units: the scalar ALUs 34a–34d, the special function unit (SFU) 36, and the multiplexer 44, thereby providing a very simple implementation.

Figure 5:
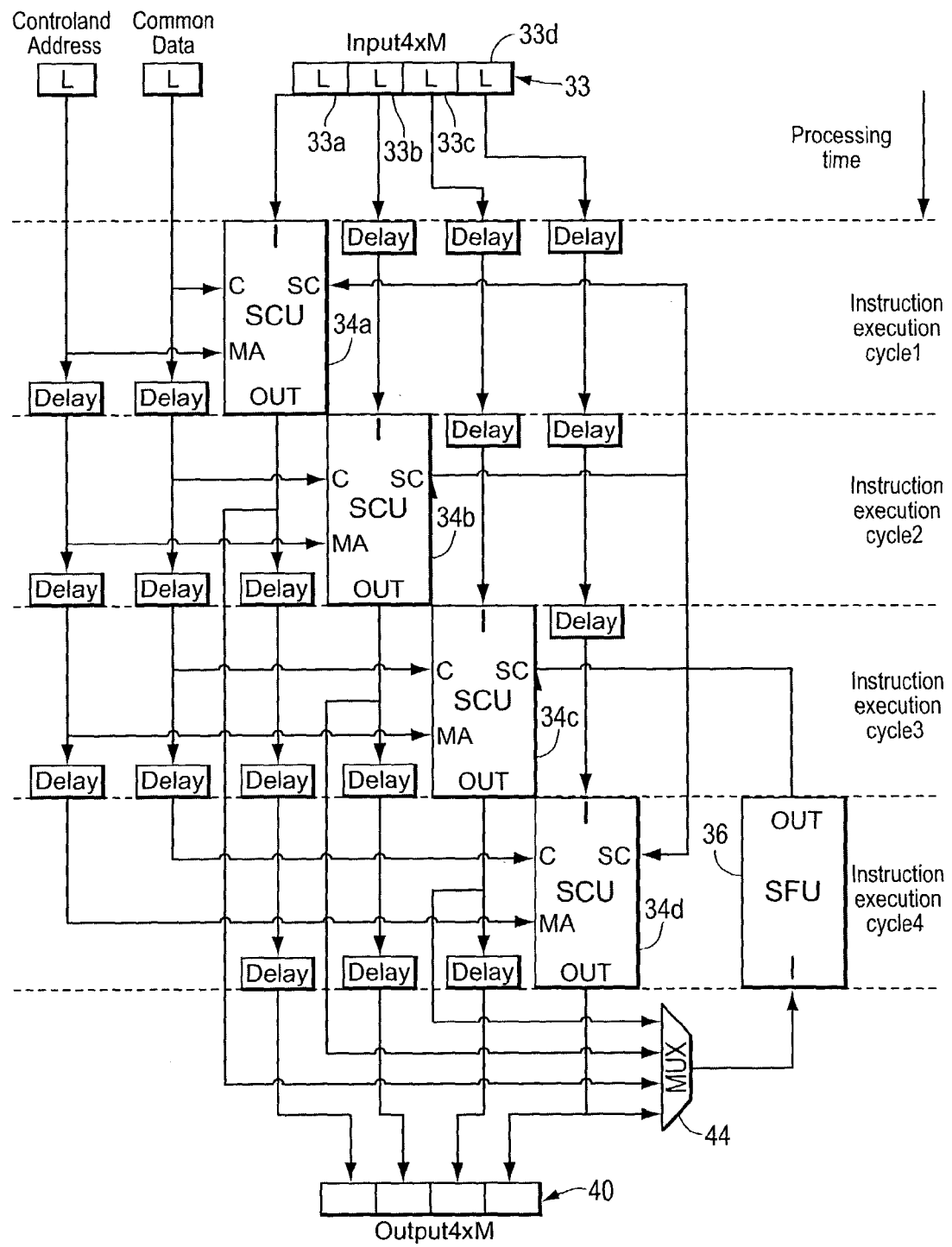
FIG. 5 is an instruction timing diagram for the vector SIMD processing unit of the present invention.
Figure 6:
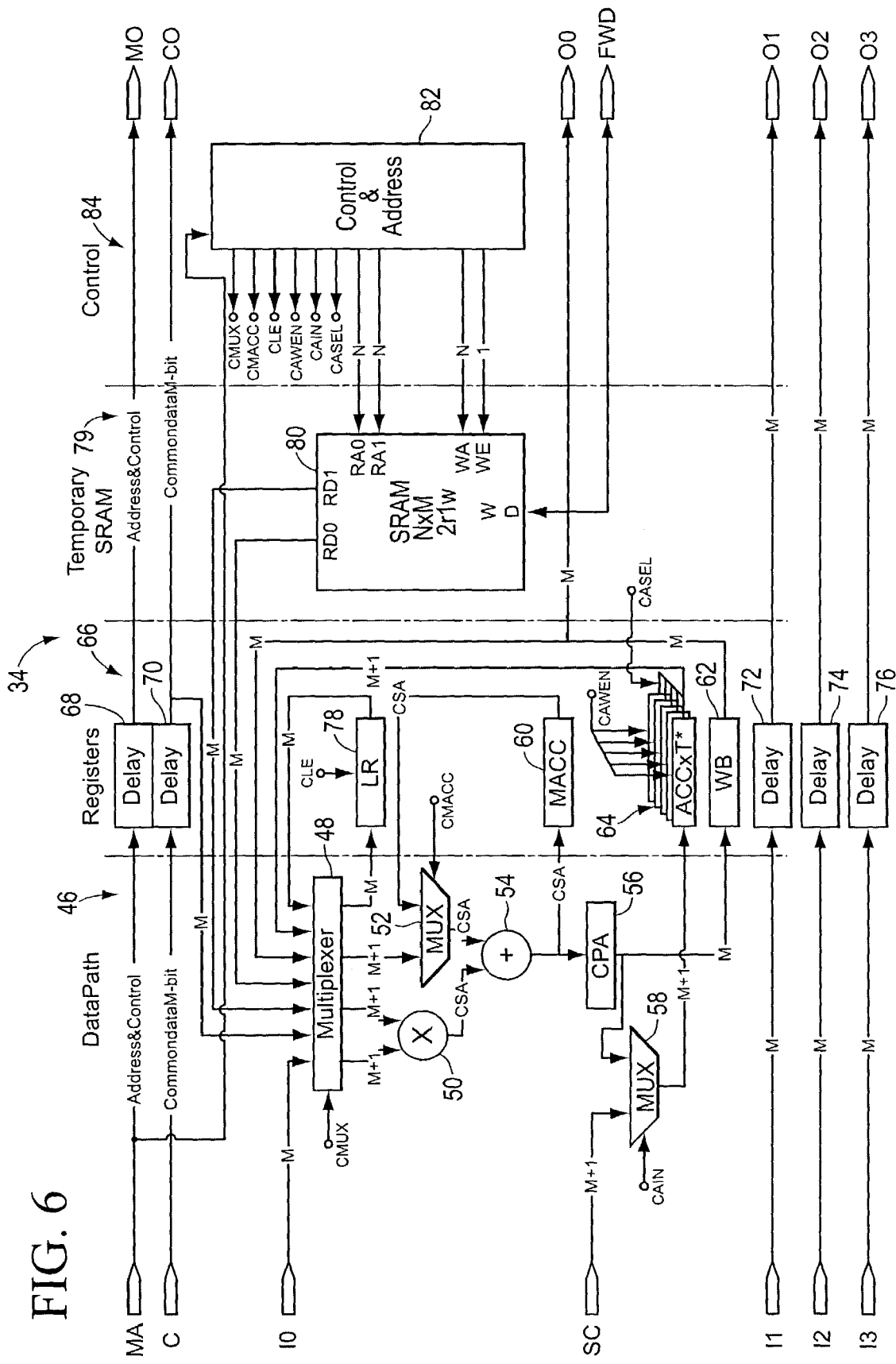
FIG. 6 is a circuit diagram of the internal structure of the scalar arithmetic and logic unit (SCU) shown in FIG. 4.

Referring to FIGS. 4, 5, and 6, an example of the instruction cycle timing with the scalar processor 42 is shown. In the first instruction execution cycle (1), the first scalar ALU 34a receives the first component 33a at the input I0 of the first scalar ALU 34a and operates on the first component 33a. The first scalar ALU 34a receives control and address data from the microcode unit and receives the common data from memory. Referring to FIG. 6, the control and common data are delayed during the instruction execution cycle in the control and common delay registers 68 and 70 and forwarded serially to the to the next scalar ALU 34*b* to be operated on during the next instruction execution cycle. Similarly, the scalar units 34*b*, 34*c*, and 34*d* delay and forward the corresponding control and common data to each other sequentially in the same manner. Conversely, referring to FIG. 4, the input vector component data 33*b* will be transferred to the input I1 of the second scalar ALU 34*b*. As seen in FIGS. 4 and 6, the input vector component data 33*b* will be delayed by register 72 until the next instruction cycle when it will be forwarded from O1 to input I0 of the same scalar ALU 34*b*. The other scalar ALUs 34*c* and 34*d* will receive this input data to input I2 and I3 respectively to provide the required delay for each vector component 33*c* and 33*d*.

During the second instruction execution cycle (2), the second scalar ALU 34*b* operates on the second component 33*b* while forwarding control and common data after delay to the third scalar ALU 34*c*. At the same time, the output from the first scalar ALU 34*a* and the other vector input vector components 33*c*, 33*d* are delayed by internal delay registers of scalar ALUs 34*a*, 34*c*, and 34*d*. Similarly, in the third instruction cycle (3), the third scalar ALU 34*c* operates on the third component 33*c* while the other signals are delayed. In the fourth instruction cycle (4), the fourth scalar ALU 34*d* operates on the fourth component 33*d* while the other signals are delayed. As can be recognized, each scalar ALU 34*a*–34*d* processes the same instruction on a respective component of the vector, but at a different time. The internal delay registers for the input and output vector components align the output data at the final processing cycle so that a valid result for each executed instruction is provided at every cycle.

By delaying the signals during each instruction cycle and staggering the operation of each scalar ALU 34*a*–34*d*, it is possible to perform the scalar computation using only one special function unit. Specifically, as seen in FIG. 5, the output of each scalar ALU 34*a*–34*d* is bypassed to the input of the multiplexer 44 (i.e., the Fwd output shown in FIG. 4). By bypassing the delay, it is possible for the SFU 36 to perform the function at the appropriate execution instruction cycle. The output of the SFU 36 is inputted into the SC input of each scalar ALU 34*a*–34*d*. In this regard, it is possible to use a single SFU 36 in the scalar processor 42.

Referring to FIG. 6, the internal structure of each scalar ALU 34*a*, 34*b*, 34*c*, and 34*d* is shown. The structure of each scalar ALU 34 is not dependent upon the position of the scalar ALU 34 within the processor 42. The variation of the port connections define the position of the scalar ALU 34 within the processor 42. The scalar ALU 34 has a datapath section 46 which includes a 7×4 multiplexer 48. One of the inputs of the 7×4 multiplexer 48 is port I0. The other inputs to the 7×4 multiplexer 48 are common data, and registered data from internal register file 80, write back register 62, accumulator 64, and load register 78. The datapath section 46 further includes a multiplier 50 connected to two outputs of the multiplexer 48. Additionally, a 2×1 multiplexer 50 is also connected to one of the outputs of the 7×4 multiplexer 48. Another input of the 2×1 multiplexer 50 is connected to the output of a multiply accumulator (MACC) 60. The output of the multiplier 50 and the output of the multiplexer 52 are connected to the inputs of an adder 54. The output of the adder 54 is connected to the input of the multiply accumulator (MACC) 60 and a carry propagation adder (CPA) 56. The multiplier 50, adder 54 and CPA 56 form an arithmetic calculation unit for the ALU 34. The output of the CPA 56 is connected to the input of a write back (WB) register 62 which generates the output O0 and also connects it to an input of the 7×4 multiplexer 48 and register file 80.

The datapath section 46 further includes a second 2×1 multiplexer 58 which has an input connected to the output signal of the CPA 56 and the data return signal SC from the special function unit 36. The output of the multiplexer 58 is fed into an accumulator register ACCxT 64 for accumulating each thread of the process in the register 64. The output of the accumulator register 64 is connected to one of the inputs of the 7×4 multiplexer 48.

The scalar ALU 34 further includes a register section 66 which contains delay and processing registers. Specifically, the register section 66 has an address and control delay register 68 and a common data delay register 70 which provide the necessary timing delay to the address/control signals, as well as the delay for the common data signals, as previously described for FIG. 5. The register section 66, also includes a load register (LR) 78 which loads results from the 7×4 multiplexer 48. The register section 66 also has three input delay registers 72, 74, and 76 which delay the input signals I1, I2, and I3 as discussed for FIG. 5.

Referring to FIG. 6, in memory section 79, the scalar ALU 34*a* has a temporary SRAM memory 80 that is an N×M bit 2r1w SRAM memory which provides read output signals RD0 and RD1 to the 7×4 multiplexer 48. The memory 80 is controlled by control and address module 82 of control section 84 which receives address and control data from port MA and generates the appropriate address and control signals to the multiplexers 48, 50 and 52, as well as the accumulator 64 and load register 78.

Figure 1:
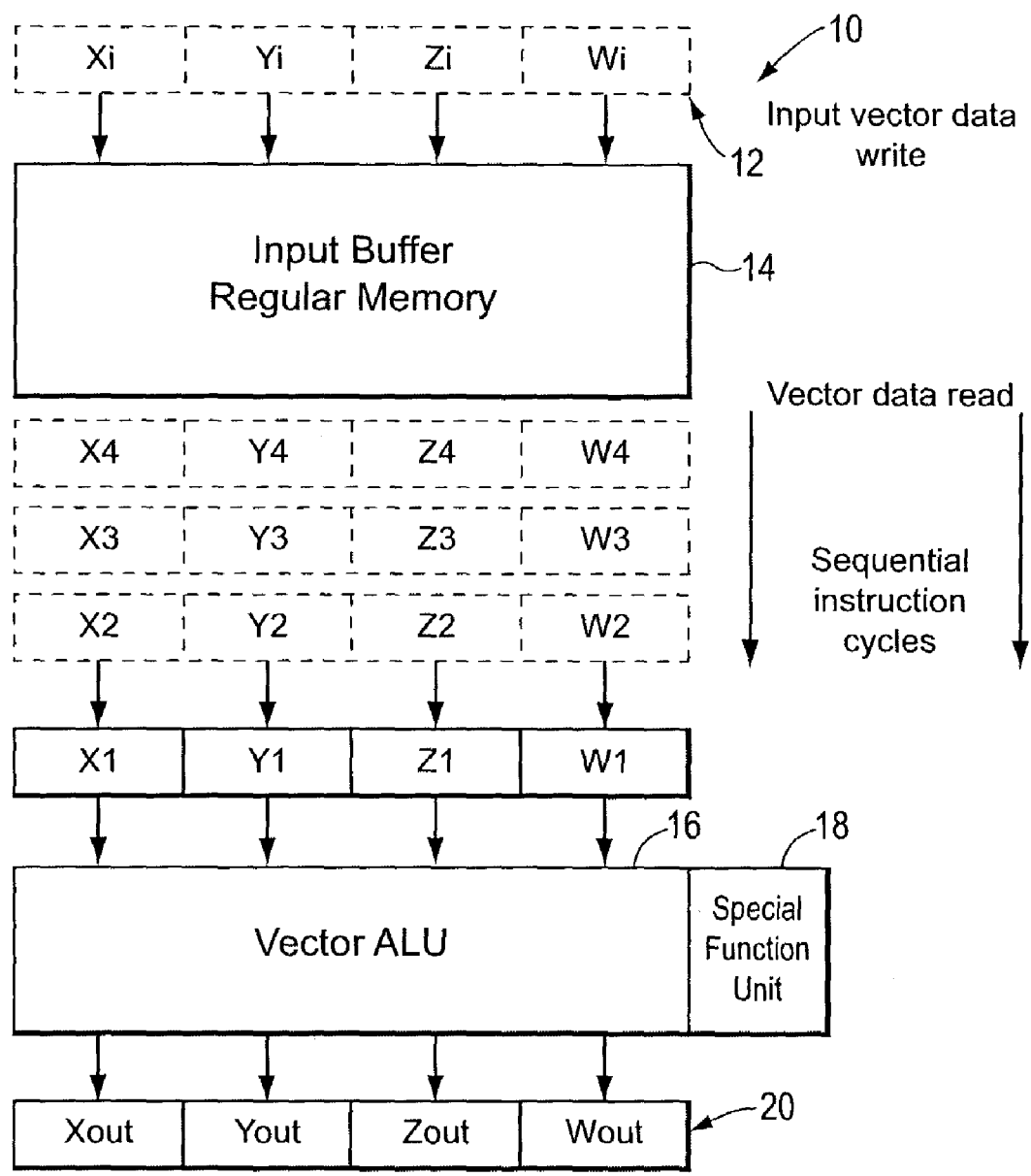
FIG. 1 is a data flow diagram for a prior art vector processing unit.
Figure 2:
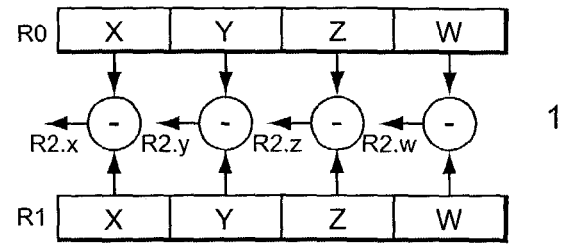
FIG. 2 is a datapath representation for processing one set of data with the prior art vector processing unit.
Figure 2:
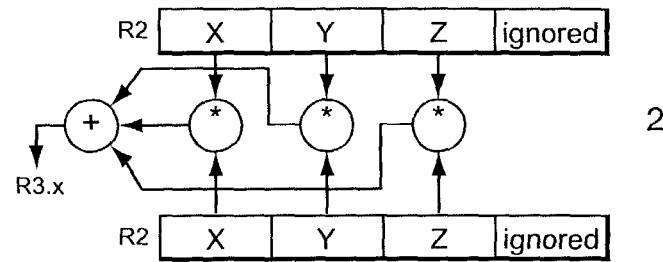
Figure 2:
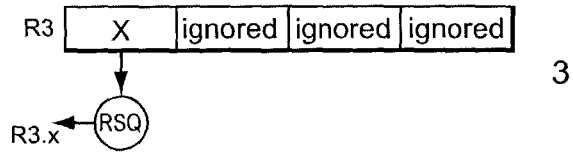
Figure 2:
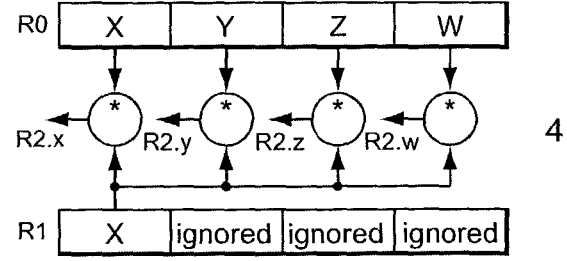
Figure 2:
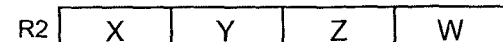

An example of the instruction cycle for the present invention will now be described with the aid of FIG. 7. The function is the same for a normalized vector difference as was described for FIG. 2:

vector Normalized_Difference (vector *V1*, vector *V2*)

$V1 \rightarrow r0.xyzw = r0[0], r0[1], r0[2], r0[3]$ $V2 \rightarrow r1.xyzw = r1[0], r1[1], r1[2], r1[3]$ (*x*, *y*, *z*, *w*—components of graphics data vector,

*r*[0–3] as separate scalars)

The corresponding instructions for this function for use with the scalar processing unit 30 are:

| | | |
|---|---|---|
| Repl (j<3) | SUB r2[j],k r0[j], r1[j] | //subtraction of all components |
| Repl (j<3) | MAC Null, r2[j], r2[j] | //dot product of all components with result in x-component, implements as multiply-accumulate |
| RSQ ACC, FWD | | //reciprocal square root of result in x-component forwarded to Special Function Unit, paired with MAC |
| Repl (j<3) | MUL r2[j], r2[j], ACC | //Scaling all components with the RSQ result |
| (Repl (j<3) - replication prefix of the same instruction) | | |

Figure 7A:
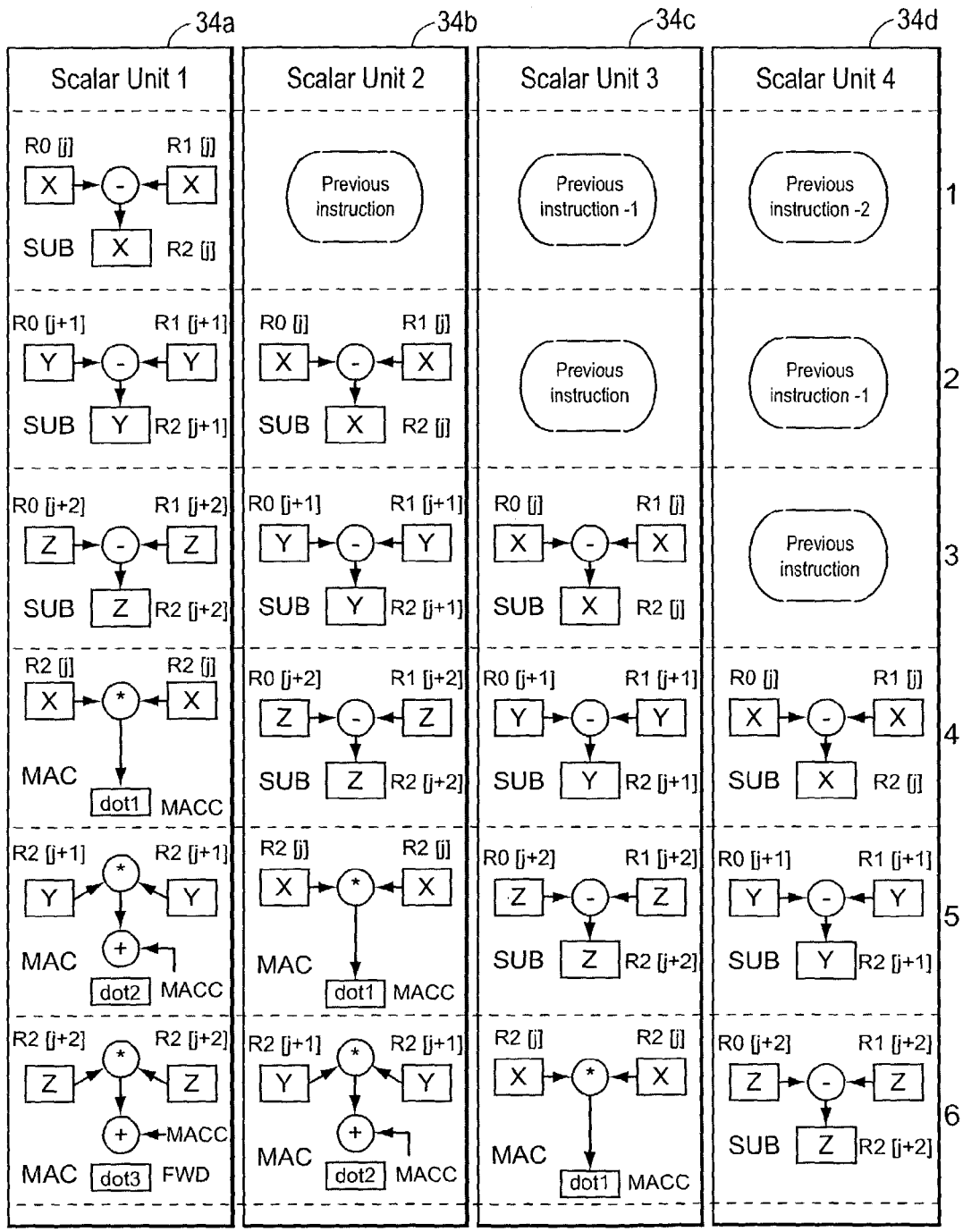
FIG. 7 is a datapath representation for processing one set of data with the vector processing unit of the present invention.
Figure 7B:
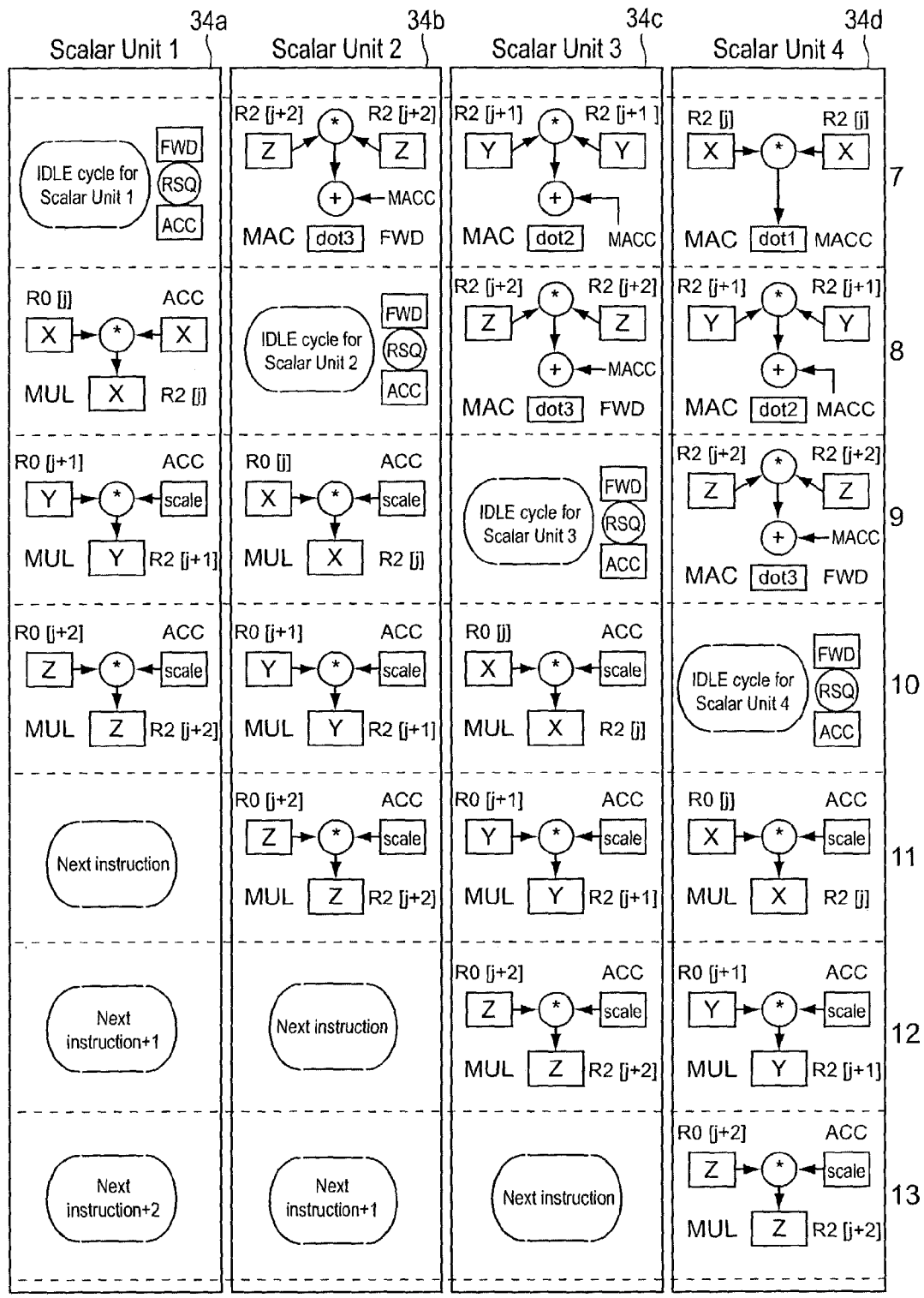

FIG. 7 shows the operation that each of the scalar ALUs 34*a*–34*d* perform for the preceding function: vector Normalized_Difference (vector V1, vector V2). In the first instruction cycle (1), the first scalar ALU 34*a* performs the subtraction on the first x component. Then in the second instruction cycle (2), the scalar ALU 34*a* performs the subtraction on the y component, and in the third instruction cycle (3), the scalar ALU 34a performs the subtraction on the z component. Beginning with the fourth instruction cycle (4), the scalar ALU 34a begins performing the dot product of all of the components by implementing a multiply-accumulate operation. Specifically, in the fourth instruction cycle (4), the x component is multiplied. In the fifth instruction cycle (5), the y component is multiplied, and the in the sixth instruction cycle (6), the z component is multiplied in order to achieve the dot product. Next in the seventh instruction cycle (7), the dot product is forwarded to the special function unit 36 in order to perform the reciprocal square root (RSQ) thereon. As previously mentioned, the special function unit 36 is operable to perform special functions such as square root, reciprocal square root, log, exp, etc. . . . that cannot be performed by the ALU 34a. While the special function unit 36 is performing the RSQ operation, the scalar ALU 34a remains in an idle state while the result is being obtained and placed in the accumulator (ACC). In the eighth instruction cycle (8), the result in the accumulator (ACC) is multiplied by the x component in order to scale the result. Similarly, the result in the accumulator is multiplied by the y component in the ninth instruction cycle (9), and the z component in the tenth instruction cycle (10). Therefore, the result from the first scalar ALU 34a is ready in ten instruction cycles in which the scalar ALU 34a is busy in nine instruction cycles and only idle in one instruction cycle.

The second, third, and fourth scalar ALUs 34b, 34c, and 34d perform the same instructions as the first scalar ALU 34a on respective vector components, however delayed. Specifically, as seen in FIG. 7, the second scalar ALU 34b performs the same instructions as the first scalar ALU 34a on the second set of components but delayed one instruction cycle. The instructions operated by the third scalar ALU 34c are delayed one instruction cycle from the second scalar ALU 34b, and the instructions performed by the fourth scalar ALU 34d are delayed one instruction cycle from the third scalar ALU 34c.

By delaying each instruction one cycle in a subsequent ALU 34a–34d, it is possible to use only one special function unit 36 in the scalar processor 42. For example, in instruction cycle seven (7) for the function shown in FIG. 7, the special function unit 36 will process the reciprocal square root (RSQ) for the instruction thread of the first scalar ALU 34a. In the eighth instruction cycle (8), the special function unit 36 will process the reciprocal square root for the instruction thread of the second scalar ALU 34b. For the third scalar ALU 34c, the reciprocal square root will be processed in instruction cycle nine (9) and for the fourth scalar ALU 34d, the reciprocal square root will be processed in instruction cycle ten (10).

The SIMD scalar processing unit 30 can process four sets of graphics data simultaneously with each of the scalar ALUs 34a–34d. As seen in FIG. 7, to completely perform the operation, it only takes a total of thirteen instruction cycles (actually ten cycles on average) versus the sixteen instruction cycles for the prior art graphics processor. Furthermore, each scalar ALU 34a–34b uses only nine instruction cycles for processing and the special function unit 36 processes during one instruction cycle. Accordingly, it takes only a total of ten instruction cycles to obtain the result for one set of graphics data whereas for the prior art processor it took a total of sixteen instruction cycles. Furthermore, the efficiency of the SIMD scalar processor 42 grows with the reduction of vector sizes. For example, for a 2-element vector, the same data can be processed in a total of 8 cycles versus the same 16 cycles required for the prior art architecture.

The present invention provides a basic scalar ALU 34a–34d that can be replicated and controlled in SIMD mode. This provides improved performance scalability and simple basic instructions with a high density of microcode. Furthermore, the present invention provides lower multi-threading support hardware overhead than the prior art with compiler simplification and a lower number of instructions. It will be recognized by those of ordinary skill in the art that the scalar processor 42 may be used in other types of processing environments and not just graphics processors.

Additional modifications and improvements of the present invention may also be apparent to those of ordinary skill in the art such as having more than four ALUs 34 in order to support larger vectors of any kind. In this respect, the number of ALUs 34 may be varied in order to provide greater efficiency. Thus, the particular combination of parts describes and illustrated herein is intended to represent only a certain embodiment of the present invention, and is not intended to serve as a limitation of alternative devices within the spirit and scope of the invention.

What is claimed is:

1. A scalar processor comprising:
   a plurality of scalar arithmetic logic units, wherein each of the scalar units is operative to perform, in a different time interval, the same operation on a different data item, each different time interval being one of a plurality of successive, adjacent time intervals, wherein each unit provides an output data item in the time interval in which the unit performs said operation and each unit provides a processed data item in a last one of the successive, adjacent time intervals;
   a multiplexer configured to provide the output data item from a selected one of the scalar units; and a single special function unit operable to provide a special function computation for the output data item of a selected one of the scalar units, in the time interval in which the selected scalar unit performs said operation, so as to avoid a conflict in use among the scalar units;
   wherein each scalar unit has an address and control path for carrying address and control information that commands said operation, said address and control path including a delay element having a delay equal to the time interval, said address and control paths being connected in series such that the address and control information arrives at each unit in the time interval in which the scalar unit performs said operation; and
   wherein each scalar unit has a data processing path and one or more delay paths, each including a delay element having a delay equal to the time interval, connected in series with the data processing path such that each different data item arrives in the scalar unit in the interval in which the unit performs said operation and such that the processed data item from each unit is available in the last of the successive time intervals.

2. A scalar processor as recited in claim 1, wherein each scalar unit has a common data path for carrying common data, said common data path including a delay element having a delay equal to the time interval, and said common data paths being connected in series such that the common data arrives at each unit in the time interval in which the scalar unit performs said operation.

3. A scalar processor as recited in claim 1, wherein the special function unit is capable of performing at least one function that cannot be performed by the scalar units.

4. A scalar processor comprising:

a plurality of means for scalar processing, wherein each scalar processing means is operative to perform, in a different time interval, the same operation on a different data item, each different time interval being one of a plurality of successive, adjacent time intervals, wherein each scalar processing means provides an output data item in the time interval in which the processing means performs said operation and each scalar processing means provides a processed data item in a last one of the successive adjacent time intervals;

means for selecting one of the processing means to provide an output data item; and means for performing a special function computation for the output data item of the selected one of the scalar processing means, in the time interval in which the selected scalar processing means performs said operation, so as to avoid a conflict in use among the plurality of processing means;

wherein each of the plurality of processing means is a scalar arithmetic topic unit;

wherein each the scalar arithmetic logic units is connected in series to an adjacent scalar arithmetic logic unit to receive the same address and control information in one of the successive time intervals; and wherein the selecting means is a multiplexer connected to receive the output data items of each of the plurality of scalar processing means and operative to provide a selected one of the output data items to the special function performing means.

5. A scalar processor as recited in claim 4, wherein the means for performing a special function computation is a single special function unit.

6. A vector processing unit comprising:

a input data buffer, having sufficient capacity to store a plurality of vectors each having a plurality of like components, and said buffer being operative to receive the plurality of vectors in row format and to provide the plurality of vectors in column format, like components of said vectors being provided at the same time;

the scalar processor of claim 1, wherein each of the arithmetic logic units of the scalar processor receives a like component of the plurality of column vectors in the same time interval and each arithmetic logic units processes with the same operation the like component in a different time interval so that each of the units can share the special function unit; and an output orthogonal converter operative to receive the processed like components of the column vectors and to convert the plurality of column vectors into a plurality of row vectors.

* * * * *